United States Patent [19]
King

[11] Patent Number: 5,917,627
[45] Date of Patent: Jun. 29, 1999

[54] OPTICAL TDM TRANSMISSION SYSTEM

[75] Inventor: Jonathan Paul King, Epping, United Kingdom

[73] Assignee: Northern Telecom Limited, Quebec, Canada

[21] Appl. No.: 08/664,150

[22] Filed: Jun. 14, 1996

[30] Foreign Application Priority Data

Jun. 17, 1995 [GB] United Kingdom ............... 9512386

[51] Int. Cl.$^6$ ........................................ H04J 14/08
[52] U.S. Cl. ........................................ 359/135; 359/158
[58] Field of Search .......................... 359/124, 135, 359/158; 370/395, 538, 539, 505, 521

[56] References Cited

U.S. PATENT DOCUMENTS

| | | | |
|---|---|---|---|
| 4,393,279 | 7/1983 | Cochrane et al. | 179/175.31 R |
| 4,488,296 | 12/1984 | Yamamoto et al. | 370/104 |
| 4,677,608 | 6/1987 | Forseberg | 370/11 |
| 4,809,256 | 2/1989 | Smith et al. | 370/4 |
| 4,893,306 | 1/1990 | Chao et al. | 370/94.2 |
| 5,400,163 | 3/1995 | Mizuochi et al. | 359/124 |
| 5,487,120 | 1/1996 | Choy et al. | 385/24 |
| 5,589,969 | 12/1996 | Taga et al. | 359/124 |
| 5,699,081 | 12/1997 | Denkin et al. | 359/341 |

FOREIGN PATENT DOCUMENTS

| | | |
|---|---|---|
| 0 486 874 A2 | 6/1991 | European Pat. Off. . |
| 0 604 040 A1 | 3/1993 | European Pat. Off. . |

OTHER PUBLICATIONS

Philips Telecommunication Review, vol. 40, No. 2, Jul. 1982, N.A. Buijs "Philips optical fibre transmission systems: II. The equipment family", pp. 71–88.

*Primary Examiner*—Kinfe-Michael Negash
*Attorney, Agent, or Firm*—Lee, Mann, Smith, McWilliams, Sweeney & Ohlson

[57] ABSTRACT

In an optical TDM transmission system in which a set of N tributary channels at one bit rate are multiplexed on to a single multiplexed channel at N times the bit rate of the tributary channels, an amplitude modulation with a fundamental frequency matched to a subharmonic of the tributary bit rate is impressed on the multiplexed signal. At the demultiplexer this modulation is detected to provide a clock for separating the tributary channels in a manner which directs specific tributary channels to specific outputs without having to have recourse to reading any of the transmitted data itself.

4 Claims, 2 Drawing Sheets

OPTICAL TDM TRANSMISSION SYSTEM

BACKGROUND TO THE INVENTION

In an optical time division multiplexed (TDM) transmission system a number of channels, hereinafter referred to as tributary channels, at a relatively lower bit rate are multiplexed to provide a single multiplexed (aggregate) channel at a relatively higher bit rate. For example there may be tributary channels of 10 Gbit/s, with perhaps 2 to 8 tributaries, to make an aggregate multiplexed signal of up to 80 Gbit/s or more. In a TDM system multiplexing N tributary channels, the channels are usually combined by allocating time slots 1 to N so that every Mth bit comes from the Mth tributary channel. At the far end of a transmission link the incoming signal needs to be demultiplexed into its original N tributary channels for onward distribution as required. Clearly the multiplexed bits arrive at the far end of the link in the same order as they were originally multiplexed, but conventionally at this far end there is no information to identify which bit belongs to which tributary channel except from data information carried within the data streams of those tributary channels.

SUMMARY OF THE INVENTION

The present invention is directed to a method of enabling tributary channel identification to be made without having first to gain access to the data carried on those channels.

According to the present invention there is provided in an optical time division multiplexed digital transmission system, a method of tributary channel identification in which, at a multiplexer which multiplexes a plurality of tributary digital channels onto a single multiplexed digital channel, a tributary channel identification signal is employed to modulate the multiplexed channels, which channel identification signal has a fundamental frequency which is phase-matched with the bit rate of one of the tributary channels, or phase-matched to a subharmonic thereof.

BRIEF DESCRIPTION OF THE DRAWINGS

There follows a description of a method of tributary channel identification embodying the invention in a preferred form. The description refers to the accompanying drawings in which.

DETAILED DESCRIPTION OF PREFERRED EMBODIMENT

Figure 1:
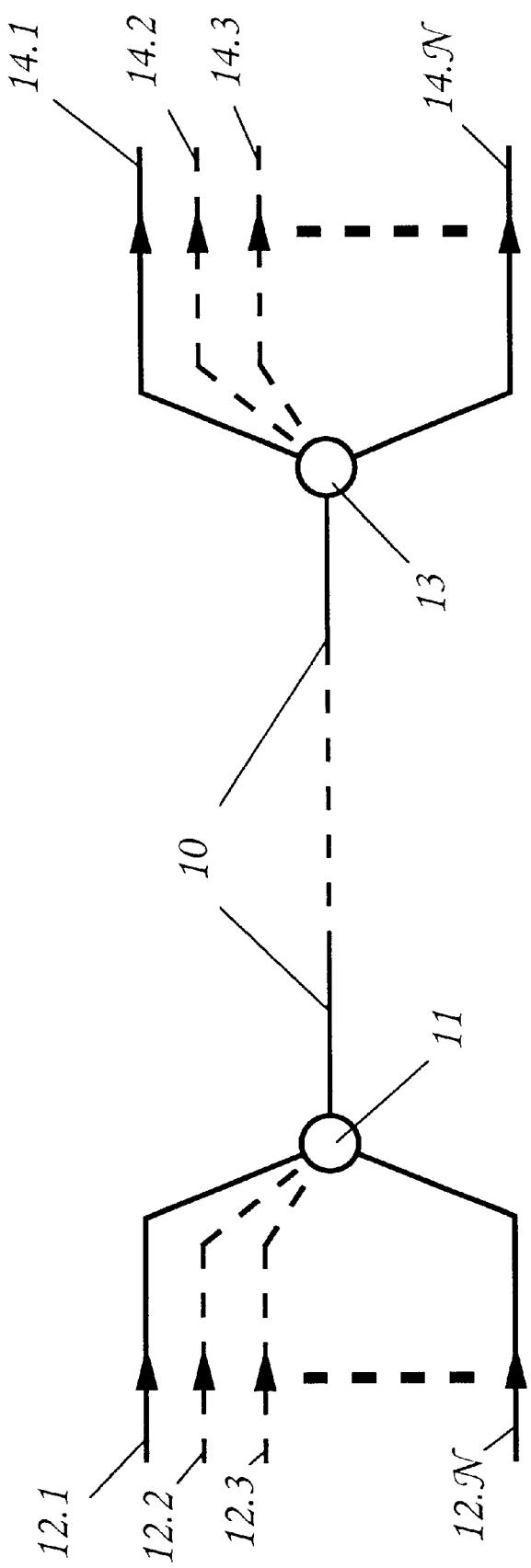
FIG. 1 is a schematic diagram of an optical TDM transmission system in which N tributary channels are multiplexed.

Referring to FIG. 1, at the upstream end of an optical TDM channel transmission link 10, a multiplexer 11 multiplexes N tributary channels applied on respectively inputs 12.1, 12.2 . . . 12.N on to the single multiplexed channel transmitted on link 10. At the far end of the link 10, a demultiplexer 13 demultiplexes the channels and applies them respectively to outputs 14.1, 14.2 . . . 14N.

Figure 2:
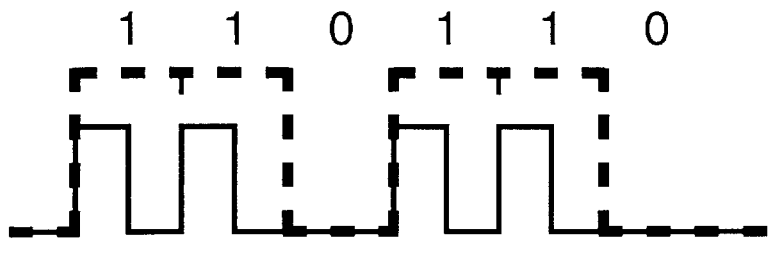
FIGS. 2 and 3 are illustrative waveforms of first and second tributary channels in a multiplexed system, where N=2.
Figure 3:
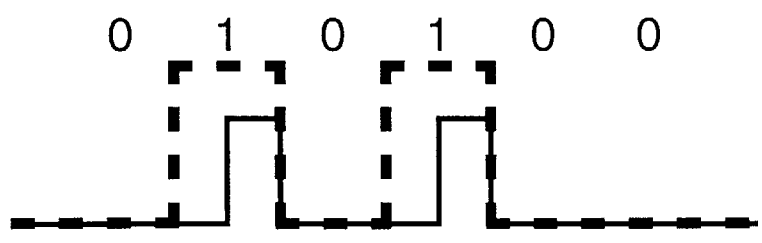
Figure 4:
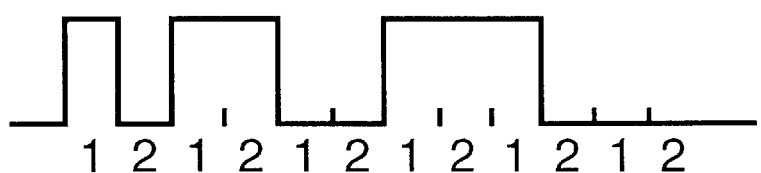
FIG. 4 is the multiplexed waveform resulting from multiplexing the waveforms of FIGS. 2 and 3, FIGS. 5 and 6 are respectively analogue and digitally amplitude modulated signals at a frequency corresponding to a submultiple (÷2) of the bit rate of one of the tributary channels of FIGS. 2 and 3.

FIG. 2 depicts, using a broken line, the waveform of a digital signal on the first tributary channel, this being by way of example the bit sequence 1, 1, 0, 1, 1, 0. FIG. 3 depicts an equivalent waveform of a different digital signal on the second tributary channel, this being by way of example the bit sequence 0, 1, 0, 1, 0, 0. These two tributary channels are to be time division multiplexed by multiplexer 11 to provide a multiplexed channel applied to link 10, this multiplexed channel operating a twice the bit rate of the tributary channels. The multiplexing function performed by multiplexer can be thought of as slicing in two individual bits of the tributary channel, taking the first slices from the first tributary channel, indicated by the solid line in FIG. 2, and adding them to the second slices from the second tributary channel (indicated by the solid line in FIG. 3). The multiplexed result is depicted in FIG. 4, which also indicates which bits pertain to which tributary channel. In the more general case of multiplexing N channels where N>2 (not illustrated in FIGS. 2 to 10) the slicing of the individual bits of the individual tributary channels is into N parts, taking the Mth slice ($1 \leq M \leq N$) from the Mth tributary channel, and operating the multiplexed channel at N times the bit rate of the N tributary channels.

Figure 5:
Figure 6:
Figure 7:
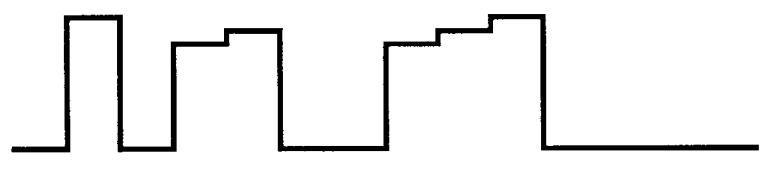
FIG. 7 is the waveform of FIG. 4 having been modulated with the waveform of FIG. 6.

In order to provide the facility of tributary channel identification at the demultiplexer 13 without having to read the data of any of those channels, the multiplexed waveform of FIG. 4 is amplitude modulated with a signal that has a fundamental frequency matched with the bit rate of one of the tributary channels or a subharmonic of that bit rate. Among the possibilities, this signal can be a simple tone, as depicted in FIG. 5, it can be a stepped waveform stepped at the multiplexed channel bit rate as depicted in FIG. 6, or it may be a code (not illustrated), for instance a code that will allow error correcting techniques to be used to give protection in the event of a channel time slot failure. In the case of the specific signals of FIGS. 5 and 6 the fundamental frequency of those signals is at half the bit rate of the tributary channels. The amplitude modulated signal resulting from the amplitude modulation of the multiplexed waveform of FIG. 4 with this waveform of FIG. 6 is depicted in FIG. 7.

Figure 8:
FIG. 8 is the waveform of the amplitude modulation appearing at the demultiplexer of FIG. 1 at the submultiple frequency.

At the demultiplexer 13 this amplitude modulation is detected to provide, after suitable filtering (not shown), the tone illustrated in FIG. 8 whose frequency is matched with the bit rate of one of the tributary channels and hence bears a constant phase relationship with each of the tributary channels. If the tone of FIG. 8 is a subharmonic of the tributary channel bit rate (because the initial modulation applied at the multiplexer 11 had a fundamental frequency at a subharmonic of the tributary channel bit rate), then this tone is multiplied to provide the further tone of FIG. 9 which is at the tributary channel bit rate itself (rather than a subharmonic).

Figure 9:
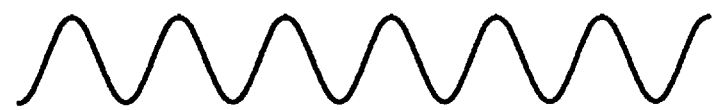
FIG. 9 is a frequency multiplied version (×2) of the waveform of FIG. 8.
Figure 10:
FIG. 10 is an optical gating waveform produced using the waveform of FIG. 9 as a clock.

The waveform of FIG. 9 is employed as a kind of locally reconstituted clock in the demultiplexer 13 to achieve tributary channel separation using one or more optical modulators (not shown) as optical gates providing optical gating waveforms as depicted in FIG. 10. For separating the multiplexed tributary channels of a multiplexed channel comprising only two multiplexed tributaries, tributary channel separation can be achieved using the two outputs of a single Mach Zehnder (MZ) type modulator. The single tone electrical waveform of FIG. 9 may not have a suitable form for direct application to such an MZ modulator, but may require the addition of one or more harmonic tones to provide a waveform with faster rising and falling edges. As an alternative to an MZ modulator, a pair of electro-absorption modulators may be used. In this instance it may be possible to rely upon the non-linear transfer characteristics of such modulators so that, solely by choice of a suitable electrical bias, a single tone electrical drive on its own provides adequately fast rising and falling edges to the optical response of the modulator without having to have recourse to adding any additional harmonic content to the electrical tone. Clearly, for demultiplexing more than two tributary channels, additional harmonics will be required.

If some malfunction of the system occurs that has the effect of removing one of the tributary channels from the multiplexed channel, this can give rise to a frequency component of amplitude modulation of the signal received at the demultiplexer 13 that is matched with the bit rate of a tributary channel. For this reason it is generally preferred for this amplitude modulation applied to the multiplexed waveform for tributary channel identification purposes to have its fundamental frequency matched with a subharmonic of the bit rate of the tributary channels rather than matched with the bit rate itself.

Transmitting a subharmonic amplitude modulation timing signal with a fundamental frequency matched to a subharmonic of the bit rate of a tributary channel, and hence phase-locked to that tributary, greatly simplifies extraction of a (subharmonic) clock signal at the demultiplexer with which to drive the channel separation. This is especially so in the case of non-return-to-zero data format. It should also be noted that each of the tributary channels can be identified at the demultiplexer using only the one amplitude modulation tributary channel identifying signal. This is because the fixed phase relationship between the tributary components in the multiplexed channel bit stream means that, once one tributary channel has been identified by its phase relationship to the tone detected at the demultiplexer, all the other tributary channels are similarly identified.

The embodiment specifically described above with reference to FIGS. 1 to 10 has employed optical amplitude modulation to form the tributary channel identification signal, but it should be understood that an alternative form of modulation, such as optical frequency or polarisation state modulation, can be used in its place. Amplitude modulation is however generally preferred because its generation and detection is usually less complex and easier to accomplish.

I claim:

1. In an optical time division multiplexed digital transmission system, a method of tributary channel identification comprising;

the step of applying, at a multiplexer which multiplexes a plurality of tributary digital channels on to a single multiplexed digital channel, a tributary channel identification signal to modulate said single multiplexed digital channel, which channel identification signal has a fundamental frequency which is phase-matched with the bit rate of one of the tributary channels;

the step of extracting, at a demultiplexer which demultiplexes the single multiplexed digital channel into its plurality of tributary channels, said channel identification signal, and employing it to generate a clock; and the step of employing, at said demultiplexer, the clock to demultiplex said single multiplexed digital channel into its plurality of tributary channels, routing each specific tributary channel into an associated output port specific to that specific tributary channel.

2. In an optical time division multiplexed digital transmission system, a method of tributary channel identification as claimed in claim 1, wherein the tributary channel identification signal amplitude modulates the multiplexed channels.

3. In an optical time division multiplexed digital transmission system, a method of tributary channel identification comprising;

the step of applying, at a multiplexer which multiplexes a plurality of tributary digital channels on to a single multiplexed digital channel, a tributary channel identification signal to modulate said single multiplexed digital channel, which channel identification signal has a fundamental frequency which is phase-matched with a subharmonic of the bit rate of one of the tributary channels;

the step of extracting at a demultiplexer which demultiplexes the single multiplexed digital channel into its plurality of tributary channels, said channel identification signal, and employing it to generate a clock; and the step of employing, at said demultiplexer, the clock to demultiplex said single multiplexed digital channel into its plurality of tributary channels, routing each specific tributary channel into an associated output port specific to that specific tributary channel.

4. In en optical time division multiplexed digital transmission system, a method of tributary channel identification as claimed in claim 3, wherein the tributary channel identification signal amplitude modulates the multiplexed channels.

* * * * *